United States Patent [19]

Nishijima et al.

[11] 4,167,857

[45] Sep. 18, 1979

[54] MARINE DIESEL ENGINE AND SHIP EQUIPPED WITH THE SAME

[75] Inventors: Isamu Nishijima; Masuichi Yasuda; Yukio Tomita; Takayuki Wakabayashi; Munetsugu Fukagawa; Kenjiro Nabeshima; Takeyasu Matsui; Kazuo Nishimura; Hiroshi Nomura; Kiyoshi Kato; Takeshi Miki; Susumu Sato, all of Osaka, Japan

[73] Assignee: Hitachi Shipbuilding & Engineering Co., Ltd., Osaka, Japan

[21] Appl. No.: 933,670

[22] Filed: Aug. 14, 1978

Related U.S. Application Data

[63] Continuation of Ser. No. 773,664, Mar. 2, 1977, abandoned.

[30] Foreign Application Priority Data

Mar. 2, 1976 [JP] Japan ................................ 51/22976
Jul. 14, 1976 [JP] Japan ................................ 51/84203

[51] Int. Cl.² ............................................ F16D 21/02

[52] U.S. Cl. ...................................... 60/716; 60/714; 115/900; 123/DIG. 8; 114/269

[58] Field of Search .................. 123/DIG. 8; 60/714, 60/716, 720, 722; 115/34 R, 900; 114/71-76, 269

[56] References Cited

U.S. PATENT DOCUMENTS

| | | | |
|---|---|---|---|
| 1,880,674 | 10/1932 | Baver | 60/714 |
| 2,046,558 | 7/1936 | Hussman | 115/900 |
| 2,419,305 | 4/1947 | Woolson | 60/716 |
| 2,655,003 | 10/1953 | Young | 60/714 |
| 2,832,201 | 4/1958 | Alexander | 60/716 |
| 3,669,230 | 6/1972 | Burkhardt | 74/661 |

*Primary Examiner*—Trygve M. Blix
*Assistant Examiner*—D. W. Keen
*Attorney, Agent, or Firm*—Joseph W. Farley

[57] ABSTRACT

A marine Diesel engine consists of parallel left and right engines mounted on a common bed plate having integral independent columns on which the cylinders of the engine are supported, the bed plate and columns forming the crank chambers of the engines. The exhaust and scavenging pipes for the engines are constructed as common parts, the scavenging pipe being mounted between the engines and being flexibly connected to at least one of them so as to permit relative movement between the engine upper portions. A single propeller shaft is driven at a desired low r.p.m. from the crank shafts of the engines through a gearing device consisting simply of a gear on the propeller shaft meshing with a pair of pinions each connected to one of the engine crank shafts by an elastic coupling. As compared with a conventional single bank Diesel engine, such a twin bank Diesel engine permits a ship of given dwt to be driven at the same speed with appreciable savings in fuel consumption, in engine weight, and in engine room size with a corresponding increase in cargo carrying capacity.

13 Claims, 16 Drawing Figures

MARINE DIESEL ENGINE AND SHIP EQUIPPED WITH THE SAME

This is a continuation of application Ser. No. 773,664, filed Mar. 2, 1977, now abandoned.

The present invention relates to a compact marine Diesel engine for use in a large ship and it also relates to a fuel saving Diesel ship equipped with said engine.

The machine Diesel Engine has undergone several periods of technical change in the course of ships going toward size and higher performance. More particularly, since the Diesel engine requires lower rate of fuel consumption than the turbine, it has been widely employed, ranging from small-sized to large-sized ships. In one such period, a single-bank multi-cylinder type high power Diesel engine was developed in order to cope with the situation of ships going toward larger size and higher speed. However, such single-bank multi-cylinder type Diesel engine, as compared with the turbine, has the disadvantage of requiring a large engine room in length, with a consequent decrease in the cargo loading capacity. Thus, past efforts at higher output of the engine by the single-bank multi-cylinder type have found themselves hitting the ceiling, and the new subject which has come up is to achieve a high power engine having a reduced engine length. As a result, in the case of the modern large-sized Diesel engine, a high power engine has been developed which has an increased cylinder diameter and an increased specific output (mean effective pressure×piston speed), so as to reduce the number of cylinders, whereby the engine length per unit horse power is shortened. However, further increasing the output of a unit cylinder involves many technical and economic problems, while the demand for further increasing the cargo loading capacity of ships and improving economy by further reducing the engine length so as to decrease the engine room length is becoming even stronger.

On the other hand, the conventional Diesel engine was developed with the main intention of making ships larger in size and higher in speed as described above as well as of saving fuel consumption. But in order to cope with increases in fuel cost due to oil price skyrocketing since the oil crisis, the demand for a high economical ship which saves fuel consumption is becoming even stronger. As for the saving of fuel consumption, there has been an attempt to reduce the propeller r.p.m. to improve the propeller efficiency and thereby reduce the engine output by an amount corresponding to the improvement of the propeller efficiency. According to this attempt, it is known that the engine efficiency can be improved about 2∼3% for every 10 revolutions by which the propeller r.p.m. is reduced.

Thus, in order to reduce the propeller r.p.m. in the case of the heretofore frequently employed single-bank Diesel engine, the r.p.m. of the Diesel engine itself would have to be reduced or a speed-reducing mechanism would have to be used. However, in order to reduce the r.p.m. of the engine itself without lowering the output of the Diesel engine, the cylinder diameter would have to be increased or the specific output would have to be increased. As a result, it becomes necessary to radially change the construction of the existing Diesel engine or in the case of resorting to the use of a speed-reducing mechanism, this has the drawback of adding to the size of the installation.

In order to deal with the problems described above, it would be conceivable to employ a twin-bank Diesel engine comprising Diesel engines arranged in two parallel lines, to thereby reduce the engine length, while using a compact speed-reducing device, to produce an output with low speed rotation. Examples in which the twin-bank Diesel engine is used as a propulsive engine for ships have been known from of old, but all of the conventional twin-bank Diesel engines are high speed small size engines and there is no example in which they are applied to large size engines of above 3,000 horse power. Thus, problems which must be solved will be encountered in application to high output large size engines.

In the case of the conventional high sped small size engine, since the momentum in each cylinder is small, it has been possible to employ a construction in which right and left engines are rigidly connected together by a single column to overcome the force caused by the above-mentioned momentum. However, in large size engines, from the standpoint of construction it is difficult to rigidly interconnect right and left engines. That is, interconnecting the whole of the right and left engines by an integral column, it not impossible, requires a high-strength member, adding much to the engine weight and hence lessening the merits of the twin-bank engine.

The principal object of the present invention is to provide a marine Diesel engine which solves the above problems and which saves the consumption of fuel necessary for propulsion of ships and reduces the engine length, height and weight, thereby reducing the size of the engine room of ships while rationalizing the engine room disposition so as to increase the cargo loading capacity. Such a twin-bank Diesel engine is constructed in such a manner that only the lower portions of the right and left engines are connected together by a single engine bed-plate while leaving the upper portions of the right and left engines independent of each other, with the irreducible minimum of connecting means provide for restraining the relative movement of the right and left engines.

Further, in the twin-bank Diesel engine, it is preferable to provide a phase difference between the cycles of the opposed cylinder pistons in the right and left engines to minimize the exciting vibration force of the engine. This, however, would result in a large amount of force acting between the right and left engines and thus wouldbring an unnegligible relative movement on the unit engines.

According to the present invention, therefore, in such a twin-bank Diesel engine, the scavening pipe and/or exhaust pipe which is or may possibly be used in common with the right and left engine, and other common parts are flexibly or shock-absorbably connected to the right and left engines so that they may not be damaged by relative movement of the right and left engines.

Further, the invention provides a marine Diesel engine, wherein unit engines each having a plurality of upright cylinders are arranged in two parallel lines, with only the lower portions thereof integrally connected to a single bed-plate, while the scavening pipe, exhaust pipe and other common parts of the two unit engines are flexibly or shock-absorbably connected to the two unit engines and the crank shafts of the two unit engines are connected through elastic couplings to a gearing device having a single output shaft to be connected to the propeller shaft. According to this arrangement, the crank shaft distance is short and a gearing device having a gear wheel fixed to its output shaft and disposed between pinions joined to the two crank shafts can be employed. Therefore, the r.p.m. of the output shaft can be easily set by a small-sized gearing device. Therefore, it is possible to provide a marine Diesel engine wherein not only can the engine length, height and weight be greatly reduced but also it is possible to freely set the r.p.m. of the output shaft according to the propeller r.p.m. demanded by the ship.

Another object of the invention is to provide a Diesel ship which is installed with a twin-bank Diesel engine is the one described above, wherein the fuel consumption is reduced by the improvement of the propeller efficiency, and the engine room size and engine weight are also reduced and hence the cargo loading capacity is increased by that much.

Other numerous features and merits of the invention will be readily understood from the following description of preferred embodiments of the invention given with reference to the accompanying drawings.

DESCRIPTION OF THE DRAWINGS

FIG. 1 is a front view;

FIG. 2 is a side view;

FIG. 3 is a plan view;

FIG. 4 is an enlarged front view in cross section;

FIGS. 5*a* through 7*b* show modifications of a gearing device section;

FIG. 5*a* is a side view showing an example;

FIG. 6 is a side view showing another example;

FIG. 7*b* is a plan view of FIG. 7*a*;

FIG. 8 is an enlarged front view in cross section;

FIG. 9 is an enlarged sectional view of the principal portions of FIG. 8;

FIG. 10 is a view similar to FIG. 9 but showing a modification;

FIG. 11 is a side view of the stern of the ship;

FIG. 12 is a plan view of FIG. 11;

DESCRIPTION OF THE PREFERRED EMBODIMENTS

Figure 1:
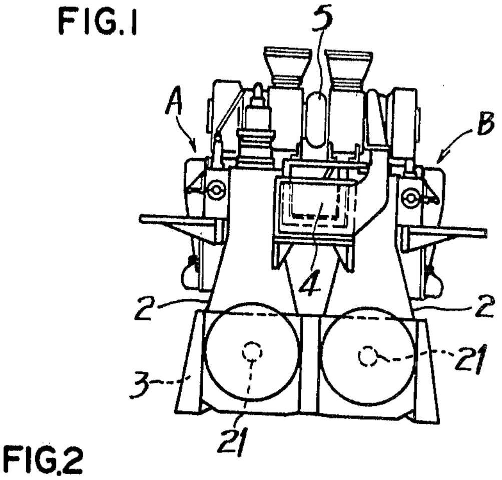
FIGS. 1 through 4 show a typical marine Diesel engine according to the present invention.
Figure 2:
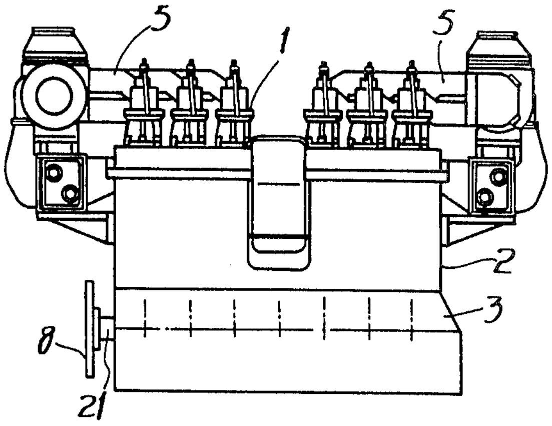
Figure 3:
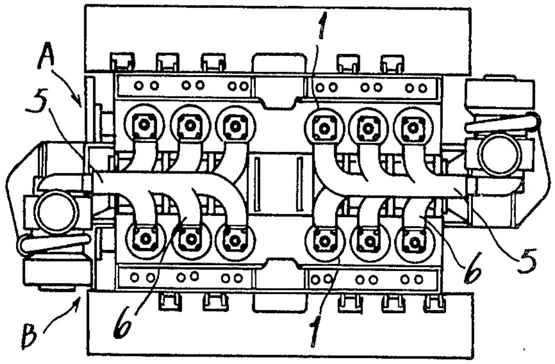

In a typical embodiment shown in FIGS. 1–4, each of the left and right engines A and B is a Diesel engine having a plurality of cylinders 1 and these engines are erected on a common bed-plate 3 by independent columns 2 and integrally connected together.

The above unit engines A and B are known, but a typical example of their internal construction will be described with reference to FIG. 4. The present invention, of course, it is not limited to the illustrated example of construction and it is applicable to engines having other constructions.

Designated at 11 are pistons each fitted in a cylinder so as to be vertically slidable along an upright cylinder liner 12, each piston 1 having a piston rod 13 fixed to the lower surface thereof so as to extend therefrom vertically downward. The piston rod 13 extends through a stuffing box 17 provided in a partition wall 16 between a crank case 15 and the lower portion of the cylinder at the bottom surface of a cylinder jacket 14 and the rod 13 slides up and down while maintaining air tightness. Each piston rod 13 has a cross-head pin 18 fixed to the lower end thereof, said cross-head pin 18 loosely receiving the upper end of a connecting rod 19 through a bearing so that said upper end is capable of rotation, the lower end of said connecting rod 19 being loosely fitted on a crank pin 20 so that said lower end is capable of rotation. Designated at 21 are two crank shafts disposed parallel with the rows of cylinders, said crank shafts being rotatably supported in an engine bed-plate 3 and being integrally formed with the crank pins 20 in eccentric relation to each other.

As for the columns 2 respectively associated with the thus constructed unit engines A and B for joining the lower portions of the unit engines A and B, and the common engine bed-plate 3, the columns 2 are structures containing the connecting rods 19 therein and strongly built under the cylinder jackets 14, and the engine bed-plate 3 having the two crank shafts 21 is integrally fixed to the lower portions of said columns 2. The columns 2 cooperate with the engine bed-plate 3 to form common or separated sealed crank chambers 15. In this embodiment, the engine bed-plate 3 is box-shaped and strongly supports the weight and forces of the unit engines, strengthening their connection, but this engine bed-plate 3 may be of other constructions to effectively support the seight and the forces. The crank shafts 21 of the unit engines project from the rear of the engine bed-plate 3 and each crank shaft 21 is provided with a fly-wheel 8 and/or an elastic coupling, said crank shafts being connected to a single propeller shaft by a gearing device to be later described.

The scavenging pipe and exhaust pipe for these two unit engines are constructed as common parts. Designated at 4 is a common scavenging pipe installed between the unit engines A and B and attached to the columns 2 by a support member. Designated at 5 are common exhaust pipes disposed in the upper region between the unit engines A and B and communicating with the cylinders 1 through exhaust branch pipes 6. In this embodiment, said exhaust pipes 5 are divided so that one is disposed behind the other, and each of the exhaust pipes 5 is used with the right and left cylinders 1, so as to allow the exhaust gas energy to be used in a supercharger, but the disposition of the exhaust pipes may be based on other known type.

Further, in the engine of the present invention, since the lower portions of the columns 2 for the unit engines A and B are supported by the common engine base plate 3 while limiting the strengthening connection of the upper portions to the irreducible minimum, it is preferable that the members connected to the unit engines, such as said common scavenging pipe 4 and the exhaust pipes 5, be flexibly or shock-absorbably connected, as will be concretely described later, rather than connected in a strengthening fashion, in consideration of the relative movement of the upper portion of the engine due to the movement of the unit engines A and B.

In practically using the engine according to the present invention, in addition to what has been described in the above embodiment, it is important to give consideration to the design so that vibrations and unbalanced couple forces due to the movement of the left and right unit engines A and B will not greatly influence the performance and strength of the engine. To this end, it is of course, necessary to assure that the phases of the piston movement of the left and right unit engines A and B are proper, but since this is a problem different from what is directly associated with the present invention, a description thereof is omitted herein.

When this point is considered only from the standpoint of the engine performance, a construction in which the entire engine is strongly joined is preferable, but in that case the engine weight would increase, so that when the engine is installed in a ship the external vibration force in the engine vibration mode would increase. Particularly when consideration is given to the fact that the subject of the present invention is a crosshead type engine with an increased engine height, the increase of the external vibration force due to the increase of the engine weight and the rise of the center of gravity would be considerable. Particularly in the case of a large size ship, as considered from the support construction of the engine, any increase in the engine weight should be avoided in the light of vibration of the entire engine. Of course, the increase of cost due to the increase of weight is the greater, the larger the engine is. Therefore, increase in the engine weight should be avoided.

The gearing device connected to the output ends of the crank shafts 21 of said two unit engines A and B will now be described with reference to FIGS. 5*a* through 7*b*.

Designated at 32 are two pinions each connected through an elastic coupling 31 to one of the respective ends of the parallel crank shafts 21. A gear 33 meshing with both of said two pinions 32 is placed in the middle of the engine between said two pinions 32. The shaft end of said gear 33 is connected to a propeller shaft 35 through a thrust shaft 34, said propeller shaft 35 carrying a fly-wheel 8 thereon. The level of the axis of the gear 33 may be optionally determined according to the required reduction gear ratio between the propeller r.p.m. and engine r.p.m. or according to the positional relation between the engine and the speed-reduction device required by the available space for installatin. For example, it may be on a level with the axes of the two pinions 32, i.e., the axes of the two crank shafts 21, as shown in FIGS. 5*a* and 5*b*, or it may be below the level thereof as shown in FIG. 6 or above the level thereof, though not shown.

Figure 5A:
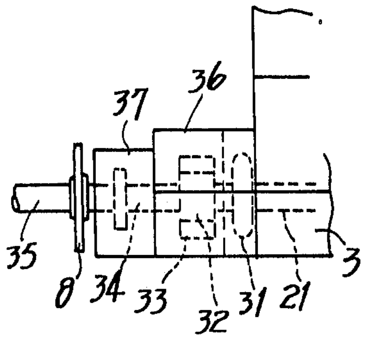
Figure 5B:
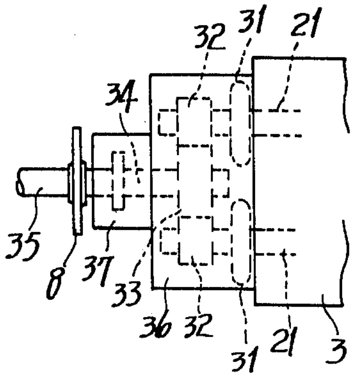
FIG. 5*b* is a plan view of FIG. 5*a*.
Figure 6:
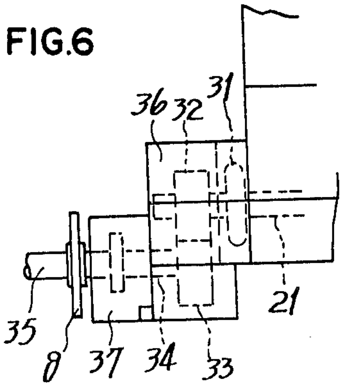

The elastic couplings 31, pinions 32 and gear 33, in FIGS. 5*a*, 5*b*, and 6, are housed in a box 36, while the thrust shaft 34 is housed in a thrust shaft bearing box 37 adjacent to or integral with the gear box 36, said gear box 36 and bearing box 37 being integrally assembled to the engine bed-plate 3. However, as shown in FIGS. 7*a* and 7*b*, said elastic couplings 31 may be disposed outside the gear box 36 and between the crank shafts 21 and gear box 36, and the gearing device may be separated from the engine bed-plate 3.

Figure 7A:
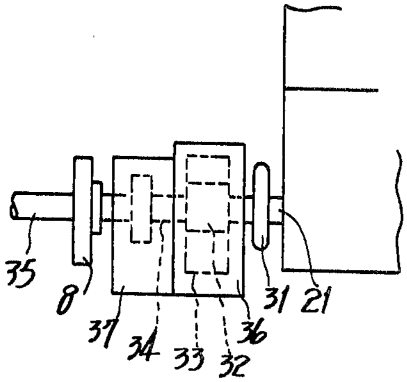
FIG. 7*a* is a side view showing a further example.
Figure 7B:
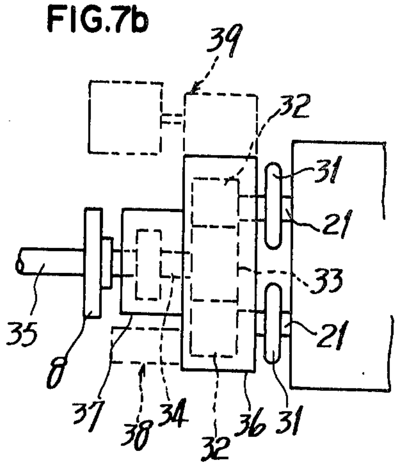

As shown in FIGS. 7*a* and 7*b*, the speed-reduction gear device may be provided with a directly connected generator 38 and a drive device for auxiliary machines (various pumps) 39 for propulsion purpose, as needed.

Figure 9:
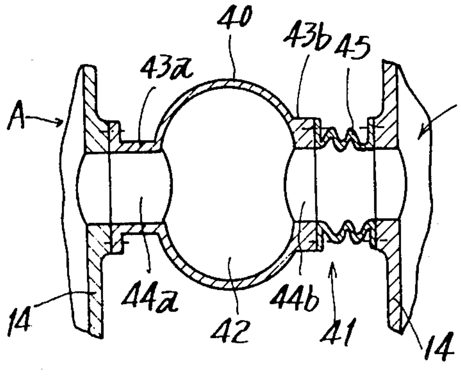
Figure 10:
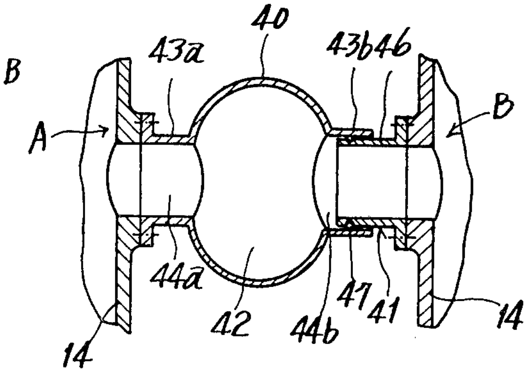

Examples of the construction for attaching common parts previously pointed out will now be described with reference to FIGS. 8 through 10.

Since the engine in the present invention is constructed on the concept of allowing relative movement of the unit engines to some extent, it is desirable that the parts used in common in said unit engines, for example, the scavenging pipe and exhaust pipes, avoid a strengthening connection and that connecting means illustrated in connection with the scavenging pipe in FIGS. 8 through 10 be employed.

Figure 4:
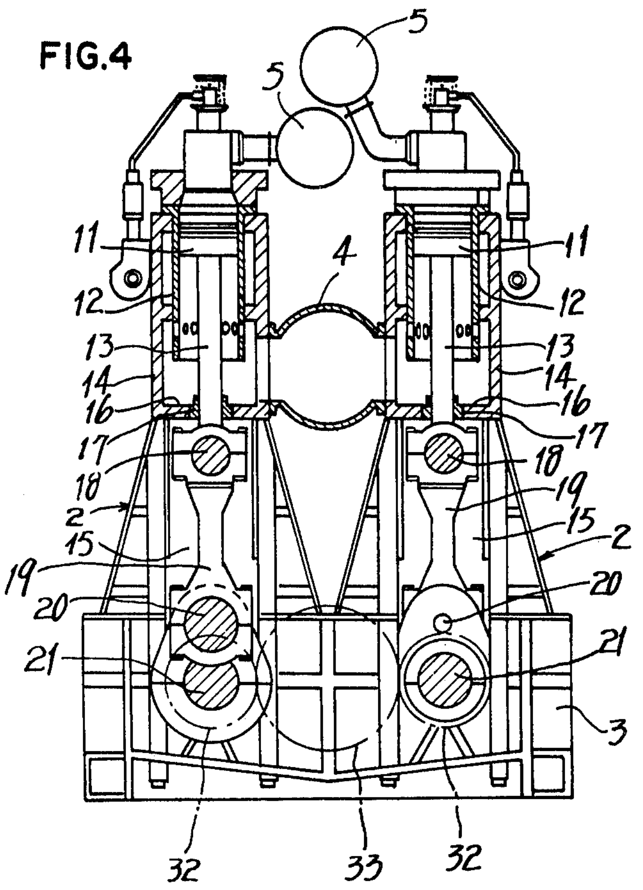
Figure 8:
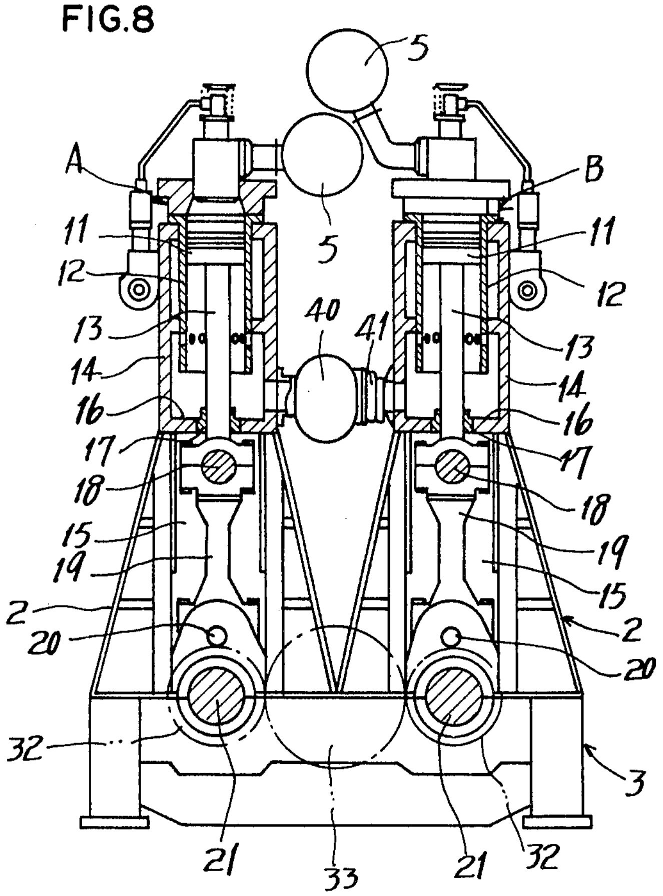
FIGS. 8 through 10 show desirable examples of the arrangement of a scavenging pipe.

In FIG. 8, the construction is identical with that shown in FIG. 4 except for the scavenging pipe 4 and the connection between it and the jackets 14, and like parts are given like reference numerals and a description thereof will be omitted. A scavenging pipe 40 is disposed between the unit engine A and B so as to extend parallel with the two crank shafts 21, and said scavenging pipe communicates with and is fixed to the cylinder jackets 14 of the unit engine A while the cylinder jackets 14 of the unit engine B and the scavenging pipe 40 communicate with each other through flexible couplings 41. More particularly, as shown in FIG. 9, the portion of the scavenging pipe 40 defining a main scavenging passageway 42 which is between the cylinders of the unit engines A and B is formed with branch pipes 43*a* and 43*b* defining branch scavenging passageways 44*a* and 44*b*. The branch pipes 43*a* opposed to the cylinders of the unit engine A are fixed to the cylinder jackets 14 through fixing elements such as bolts. On the other hand, the branch pipes 43*b* opposed to the cylinders of the unit engine B communicate with the cylinder jackets of said cylinders through flexible couplings 41. In the embodiment, such a flexible coupling 41 is shown in the form of a flexible bellows pipe 45, as as another example it is possible to employ a construction as shown in FIG. 10 wherein projecting pipes 46 extending from the cylinders of the unit engine B are slidably fitted in the branch pipes, with O-rings 47 interposed therebetween.

Disposing the scavenging pipe between the two unit engines A and B in this way makes the exterior of the unit engines neat as compared with a construction in which such a scavenging pipe is independently provided for each unit engine. Further, since a single scavenging pipe is used in common, the equipment can be made compact, and moreover, even if a change is produced in the relative position of the unit engines by vibrations thereof during operation, the use of the flexible couplings for connection accommodates the relative displacement and prevents the breakage thereof.

Figure 12:
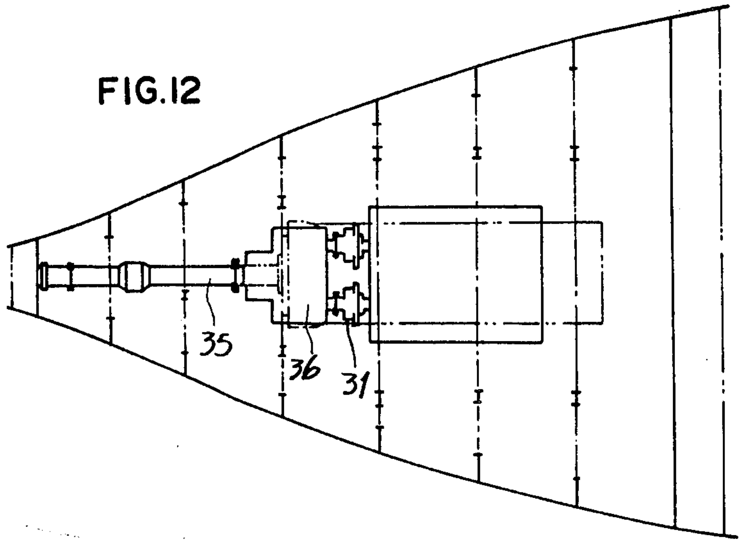
FIGS. 11 and 12 show said Diesel engine installed in the engine room of a ship in comparison with a conventional engine.
Figure 11:
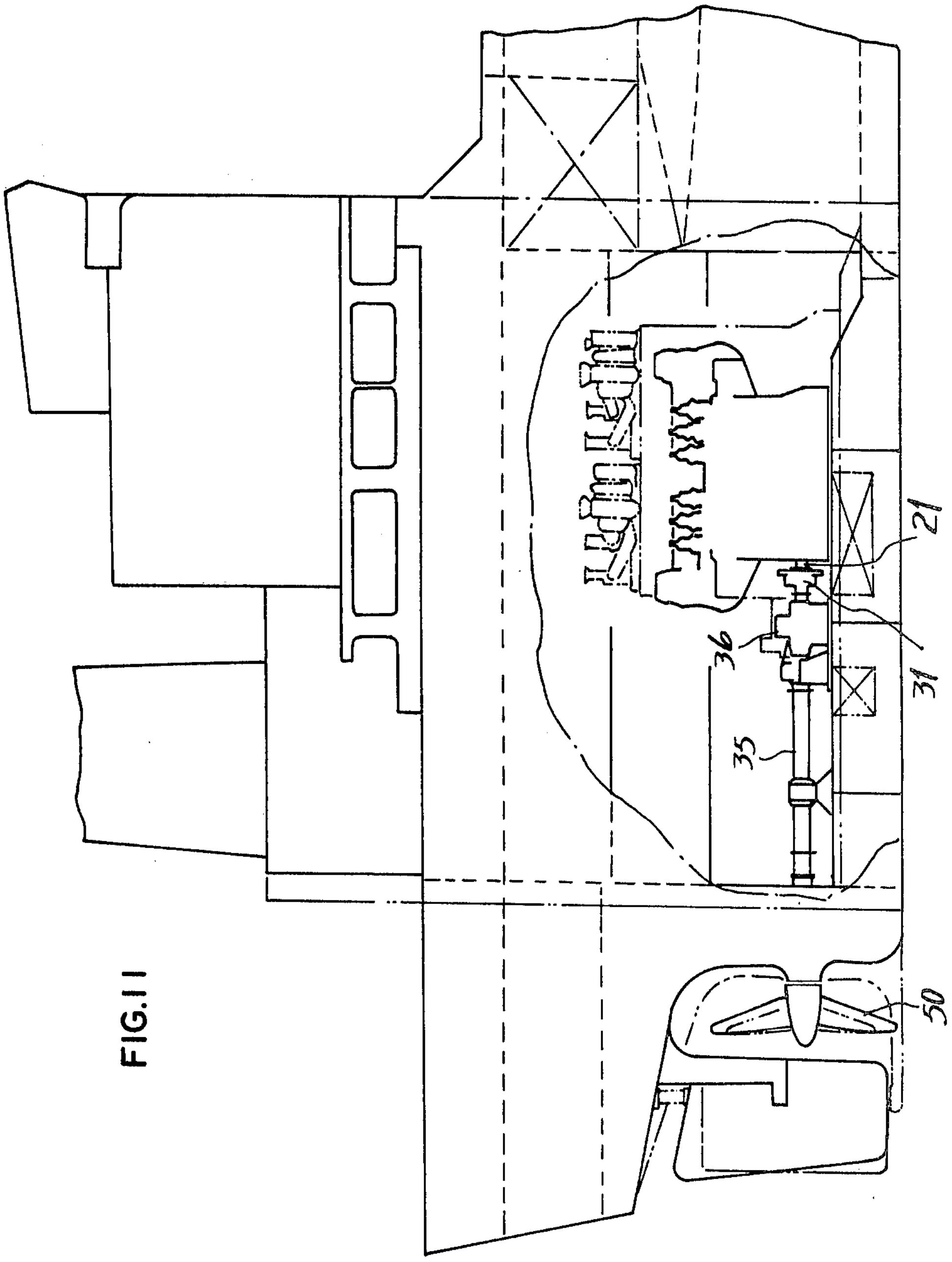

A ship which is equipped with the engine shown in the above embodiments will now be described. FIGS. 11 and 12 are respectively a side view and a plan view of the stern of a ship showing a concrete example thereof. The crank shafts 21 are connected together by the gearing device 36 through respective elastic couplings 31 so as to be reduced in speed to a suitable r.p.m. and are connected to a single propeller shaft 35. In such ship, the fuel consumption is saved with low propeller r..m. in line with the object of the present invention, at the same time the speed of the ship can be maintained by taking measures for effective propulsion includin increasing the diameter of the propeller 50 as shown in solid lines in FIG. 11 so that the necessary propulsion may be obtained even at low speed rotation. In this case, for improvement of propeller efficiency it is preferable to make the propeller r.p.m. as low as possible, but as considered from various factors such as the shape of ship it can be reduced to the range of 50–80 r.p.m. When the propeller r.p.m. is set at about 80 r.p.m., this can be achieved without requiring many changes in the shape of the ship, for example, by replacing the heel piece of a conventional inverted G type stern shown in phantom lines in FIG. 11 by a mariner type stern as shown in solid lines.

For a better understanding of the invention, an example in which it is applied to a 19,000 dwt type ship will now be described.

In the above-mentioned ship, when the ship's speed is on the order of 16 kt, as an example a conventional engine has been as follows:

the number of cylinders—7,
propeller r..m.—145, and
engine horse power—13,000 BHP.

Figure 13:
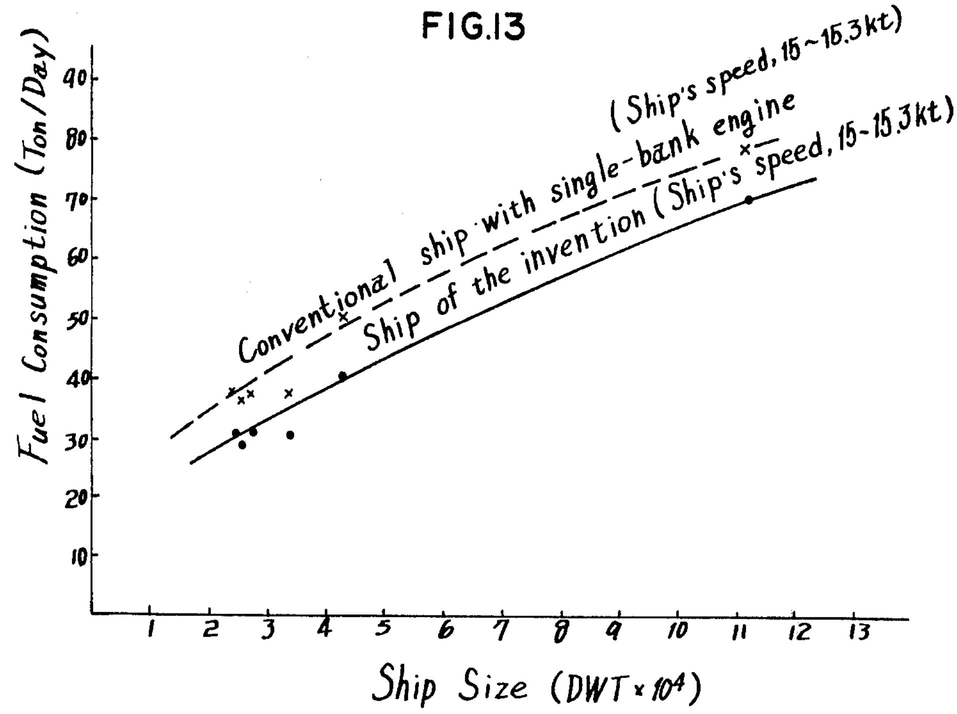
FIG. 13 is a graph showing a comparison of the fuel consumption between an engine according to the present invention and a conventional engine; and, FIG. 14 is a graph showing comparison of the engine length between a case where an engine according to the present invention is employed and another case where a conventional engine is employed.
Figure 14:
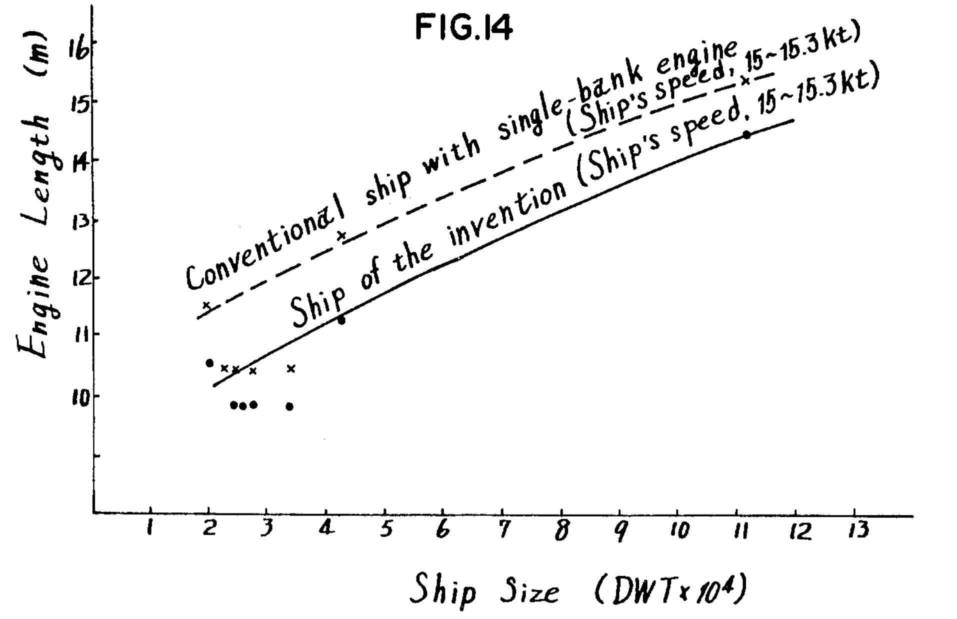

In the present invention, however, by reducing the propeller r.p.m. to 80, the horse power is reduced as follows:

the number of cylinders—2×6,
engine horse power—10,600 BHP (5,300×2), under which conditions the same ship's speed is obtained, and the fuel consumption can be reduced about 20% by the horse power reduction. In addition to the reduction of horse power described above, the fact that two low horse power engines are combined reduces the engine weight from conventional 355 tons to 247 tons, a reduction of about 30%. The width of the space for installation of the engine is increased by about 1 meter as opposed to the conventional 3.4 meters, but the total width of the engine is 6 meters, which is smaller than the conventional engine width of 6.6 meters, so that there is no trouble in installing the engine. Further, the reduction of the engine height enables the height of the space required for overhauling the engine parts (as measured from the crank shaft center) to be reduced from the conventional 8.92 meters to 5.6 meters, so that the ceiling of the engine room can be lowered from the conventional upper deck to the second deck. Since the engine length can be reduced from the conventional 11.65 meters to 6.34 meters, the length of the engine room can be reduced by 2.5 meters. As a result, the cargo loading capacity of the ship is increased by about 400 cubic meters. In the above-mentioned 19,000 dwt type ship, FIGS. 11 and 12 show the conventional engine room in phantom lines and the engine room to which the present invention has been applied in solid lines. From these figures it is seen that in the diesel ship of the present invention, the engine room can be greatly reduced in size. In FIGS. 13 and 14 plans according to the invention are compared with conventional ships regarding large-sized ships, and it has been found that the fuel consumption can be reduced by about 20% and that the engine length can be reduced by about 7∼11% even if the gearing device is included.

The diesel ship which is equipped with the diesel engine according to the present invention in the manner described above has the remarkable merits of saving energy and ship building cost and improving the profit of shipping service and contributes much to the development of the industry concerned.

Finally, functions and merits of the present invention and preferred embodiments thereof will be enumerated below.

(1) Since two rows of unit engines are put together as an integral structure, there are many common parts as compared with two independent engines and the arrangement is rational, without waste. Therefore, the engine weight and length are reduced, facilitating installation of the engine.

(2) In the system in which two independent engines are arranged side by side and taken out as a single propeller shaft through a gearing device, the reduction gear ratio is low since they are low-speed engines. On the other hand, since the engine width is large, the distance between the crank shafts of the two engines, i.e., the distance between the pinions of the gearing device cannot but be increased, so that the gearing arrangement becomes complicated as by the necessity of inserting an idle gear or there are great restrictions making it necessary to increase the size of gears more than is necessary. In the present invention, however, since the two engines are of integral construction, the distance between the crank shafts, i.e., the distance between the pinions can be minimized and without placing great restrictions on the pinions and gear, the relative positions of the pinion axes (namely, crank axes) and gear axis (namely, propeller axis) can be freely selected. Since the pinion distance is short, the diameter of the gear meshing therewith can be minimized, enabling the gearing device to be made compact. This enables the engine width to be reduced. Further, the following merits are derived.

(1) The selection of ship's optimum propeller rotative speed can be determined independently of the engine rotative speed and it becomes easy to save fuel consumption by reducing the propeller rotative speed so as to improve the propeller efficiency.

(2) The equipment can be rationally arranged in a limited space given as the engine room of a ship. More particularly, since the gear parts can be disposed in the narrow stern at the ship's bottom while the relatively wide engine parts can be disposed in the engine room in the relatively wide forward portion, an arrangement making most of the space of the engine room can be attained. Therefore, the engine room length can be minimized.

(3) As compared with the system in which the output shaft of a single-bank engine is connected to the propeller shaft while reducing the speed by using a pinion and gear pair the present invention uses two separate pinions meshing with a gear at two points, with the result that the load on the gearing device is halved in terms of strength and the size of the gearing device can be reduced even if the horse power and r.p.m. remain unchanged. Further, in the case of taking out the output shaft of single-bank engine as a propeller shaft while reducing the speed thereof, taking it out coaxially with the engine axis would require a special gear mechanism such as the planetary gear type or the locked train type, but in the present invention there is no such need and the object can be achieved by using the ordinary gearing device.

(4) The high output single-bank engine has the disadvantage of the engine length being increased as compared with the turbine engine and hence the greatest problem in connection with the installation of the engine is that the engine room length has to be increased. Therefore, it would be conceivable to bisect the engine length and arrange the engine halves side by side, but the weight thereof cannot be reduced and moreover, the engine width would be greatly increased. In contrast, in the present invention, since the engine is obtained by juxtaposing unit engines each having ½ of the intended output so as to provide said intended output, the engine length can be reduced by about, if not just, ½, and the engine width can be kept at the same level, so that there is no problem in installing the engine. Further, the engine weight is reduced as compared with a single-bank engine.

(5) In the present invention, the cross-head type distinct from the trunk piston type can be employed, so that the consumption of lubricating oil is small and it is rarely contaminated. Further, low-quality fuel oils can be used, and the operating economy is high.

(6) The frequently employed conventional system of a direct-coupled high-output low-speed single-bank diesel engine and a propeller necessitates preparing a variety of cylinder diameters in order to meet the propulsive horse power requirements of ships, whereas the present invention is capable of meeting all of the propulsive horse power requirements of ships by using very few kinds of cylinder diameter. As a result, cost reduction by rationalized production and quality improvement are easy.

(7) As in the conventional two-engine single-shaft system, single-bank operation is possible in case of emergency.

As for the constructions of the parts not described herein, various changes may be made on the basis of the prior at without departing from the spirit of the invention.

We claim:

1. A marine diesel engine comprising a box-shaped structure forming a single engine bed-plate;

a pair of crankshafts rotatably mounted in sid bed-plate in parallel side-by-side relation;

a pair of upwardly extending column structures formed integrally with said bed-plate and cooperating therewith to form crank chambers, each column structure being independent of the other column structure and being aligned with one of said crankshafts;

a row of cylinders supported on the upper end of each of said column structures, each row of cylinders having pistons and piston rods operatively associated with one of said crankshafts;

a common scavenging pipe installed between said rows of cylinders;

a single output shaft; and, a gearing device connecting said crankshafts to said output shaft.

2. A marine diesel engine as set forth in claim 1, wherein each column structure cooperates with said bed-plate to form a sealed crank chamber.

3. A marine diesel engine as set forth in claim 1, further comprising a common exhaust pipe installed between said rows of cylinders.

4. A marine diesel engine as set forth in claim 1, wherein said gearing device is connected to the crankshafts through elastic couplings.

5. A marine diesel engine as set forth in claim 1, wherein said gearing device comprises a pinion connected to each of said crankshafts, and a gear having its center disposed in a vertical plane extending through the center between said pair of crankshafts, said gear meshing with said pinions and being directly connected to said output shaft.

6. A marine diesel engine as set forth in claim 1, wherein said gearing device is integrally combined with said engine bed-plate.

7. A marine diesel engine as set forth in claim 1, wherein said gearing device is provided separately from said engine bed-plate.

8. A marine diesel engine as set forth in claim 1, wherein auxiliary machinery is connected to said gearing device so as to be driven thereby.

9. A marine diesel engine as set forth in claim 1, wherein said scavenging pipe is flexibly connected to at least one of said rows of cylinders.

10. A marine diesel engine as set forth in claim 9, wherein said scavenging pipe communicates with both of said rows of cylinders through coupling pipes.

11. A marine diesel engine as set forth in claim 10, wherein at least one of said rows of cylinders and said scavenging pipe communicate with each other through expandable coupling pipes.

12. A marine diesel engine as set forth in claim 11, wherein said coupling pipe is a bellows pipe.

13. A marine diesel engine as set forth in claim 11, wherein each of said coupling pipes consists of a double pipe having pipe elements which are mutually expansively and gas-tightly put together.

* * * * *

UNITED STATES PATENT AND TRADEMARK OFFICE
CERTIFICATE OF CORRECTION

PATENT NO. : 4,167,857

DATED : September 18, 1979

INVENTOR(S) : Isamu Nishijima et al

It is certified that error appears in the above-identified patent and that said Letters Patent are hereby corrected as shown below:

Column 1, line 10, "machine" should read -- marine --;

Column 1, line 12, after "toward" insert -- larger --;

Column 1, line 65, "radially" should read -- radically --;

Column 2, line 40, "provide" should read -- provided --;

Column 2, line 52, "scavening" should read -- scavenging --;

Column 2, line 54, "engine" should read -- engines --;

Column 2, line 62, "scavening" should read -- scavenging --;

Column 3, line 12, "is" (second occurrence) should read -- as --

Column 3, line 53, after "showing" insert -- a --;

Column 4, line 5, "1" should read -- 11 --;

Column 4, line 43, "scavening" should read -- scavenging --;

Column 5, line 49, "installatin" should read -- installation --;

Column 6, line 26, after "the" insert -- two --;

UNITED STATES PATENT AND TRADEMARK OFFICE

CERTIFICATE OF CORRECTION

PATENT NO. : 4,167,857

DATED : September 18, 1979

INVENTOR(S) : Isamu Nishijima et al

It is certified that error appears in the above-identified patent and that said Letters Patent are hereby corrected as shown below:

Column 6, line 63, "includin" should read -- including --;

Column 9, line 26, "at" should read -- art --;

Column 9, line 32, "sid" should read -- said --.

Signed and Sealed this

*Twentieth* Day of *November 1979*

[SEAL]

*Attest:*

RUTH C. MASON
*Attesting Officer*

LUTRELLE F. PARKER
*Acting Commissioner of Patents and Trademarks*